(12) United States Patent
Yoshida

(10) Patent No.: US 7,526,370 B2
(45) Date of Patent: Apr. 28, 2009

(54) ALTERNATIVE INPUT CONTROL METHOD AND DEVICE

(75) Inventor: Yuri Yoshida, Nagoya (JP)

(73) Assignee: DENSO Corporation, Kariya (JP)

( * ) Notice: Subject to any disclaimer, the term of this patent is extended or adjusted under 35 U.S.C. 154(b) by 132 days.

(21) Appl. No.: 11/487,463

(22) Filed: Jul. 17, 2006

(65) Prior Publication Data
US 2007/0016347 A1    Jan. 18, 2007

(30) Foreign Application Priority Data

| Jul. 15, 2005 | (JP) | ............................. 2005-206989 |
| Jul. 19, 2005 | (JP) | ............................. 2005-208285 |
| Jun. 23, 2006 | (JP) | ............................. 2006-174393 |

(51) Int. Cl.
*G06F 7/00* (2006.01)
(52) U.S. Cl. ............................. 701/36; 701/29; 701/49; 340/428; 340/455
(58) Field of Classification Search ................ 340/455, 340/425.5, 428; 701/1, 16, 29, 36, 49
See application file for complete search history.

(56) References Cited

U.S. PATENT DOCUMENTS

| 5,486,817 | A  * | 1/1996 | Ina .............................. 340/3.42 |
| 6,989,978 | B2 * | 1/2006 | Hiraku et al. ................. 361/86 |
| 7,024,296 | B2 * | 4/2006 | Squires et al. ................ 701/48 |
| 7,078,829 | B2 * | 7/2006 | Hunninghaus et al. ..... 307/10.6 |
| 7,156,065 | B2 * | 1/2007 | Sommerfeld et al. ..... 123/179.3 |
| 2003/0216841 | A1 * | 11/2003 | Hashimoto et al. ............. 701/1 |
| 2004/0093136 | A1 * | 5/2004 | Hanamata ..................... 701/36 |
| 2005/0024102 | A1 | 2/2005 | Kondo |

FOREIGN PATENT DOCUMENTS

| DE | 102 37 718 A1 | 2/2004 |
| JP | 8-192723 | 7/1996 |
| JP | 11-194825 | 7/1999 |
| JP | 2001-37069 | 2/2001 |
| JP | 2003-195901 | 7/2003 |

OTHER PUBLICATIONS

Office Action issued on Feb. 29, 2008 in corresponding Chinese application No. 200610151394.6 with an at least partial English-language translation.
Office Action issued Spe. 26, 2008 in corresponding Chinese Application No. 2006-10151394.6.
Office Action issued Nov. 6, 2008 in corresponding German Application No. 102006032788.8 with an at least partial English-language translation thereof.

* cited by examiner

*Primary Examiner*—Gertrude Arthur Jeanglaud
(74) *Attorney, Agent, or Firm*—Nixon & Vanderhye P.C.

(57) ABSTRACT

An electronic control unit determines whether a level of a battery supply voltage is low, and whether a feedback system of a door lock control device is in an abnormal state. If the level of the battery supply voltage is determined to be low, or if the feedback system of the door lock control device is determined to be in the abnormal state, the electronic control unit performs alternative input processing. Internal control information, which is used by the electronic control unit for controlling a controlled object, is used for obtaining an alternative input value.

10 Claims, 12 Drawing Sheets

ALTERNATIVE INPUT CONTROL METHOD AND DEVICE

CROSS REFERENCE TO RELATED APPLICATION

This application is based on and incorporates herein by reference Japanese Patent Applications No. 2005-206989 filed Jul. 15, 2005, No. 2005-208285 filed Jul. 19, 2005 and No. 2006-174393 filed Jun. 23, 2006.

FIELD OF THE INVENTION

The present invention relates to a method and a device for controlling an alternative input into an electronic control unit (ECU) when a level of a battery supply voltage is low. The present invention also relates to the alternative input control method and the alternative input control device in an abnormal state of a feedback system of the ECU.

BACKGROUND OF THE INVENTION

When a conventional electronic control unit (ECU) on-off controls a relay as a controlled object, the ECU outputs a control signal to the relay (for example, JP8-192723A). Then, an input voltage that will be inputted into a relay load is fed back from a relay into the ECU. Based on the input voltage, the ECU determines (confirms) whether the relay is actually turned on or off. FIG. 3 illustrates an ON/OFF determination of the relay, which is determined to be turned off when a level of the input voltage that is fed back into the ECU is low. The relay is turned off when the input voltage is at the ground level (i.e., 0 V). The relay is turned on when the input voltage is at a level of a battery supply voltage (i.e., 12 V) of the ECU. Given the above input voltage levels, the relay is determined to be turned on if the input voltage is equal to or higher than an ON determination threshold voltage $V_{ON}$ (i.e., 4.2 V), and the relay is determined to be turned off if the input voltage is equal to or lower than an OFF determination threshold voltage $V_{OFF}$ (i.e., 2.8 V). For this reason, it cannot be determined whether the relay is determined to be turned on or off when the input voltage is between $V_{OFF}$ and $V_{ON}$ (i.e., when the input voltage is higher than 2.8 V and lower than 4.2 V).

Furthermore, with respect to the conventional ECU, it is possible that the ON/OFF determination of the relay cannot be performed properly when a level of the battery supply voltage +B that is applied to the ECU becomes low because of a deterioration in a vehicular battery, a momentary voltage drop due to cranking, or the like. That is, when the level of the battery supply voltage +B becomes low, the input voltage level of the relay is likely to be erroneously determined by and incorrectly inputted into the ECU, so that an input of appropriate information on a state of a vehicle into the ECU cannot be achieved. For instance, when the battery supply voltage +B of a main body ECU, which controls a vehicle chassis, becomes lower than the ON determination threshold voltage $V_{ON}$ (i.e., 4.2 V), the relay will be erroneously determined to be turned off, and incorrect information that the relay is turned off is likely to be inputted into the main body ECU despite the fact that the relay is actually turned on. Hence, the erroneous determination and the incorrect input of a state of the relay will bring about controlling the ECU by use of input values that represent a state of the vehicle, which is different from an actual state of the vehicle. As a result, such control will not live up to users' expectations, and/or the relay will operate improperly on its own (for example, a dome lamp as a relay load may be turned on).

Moreover, there are a mechanism whereby outputs are controlled, and the ECU that determines a state of the controlled object based on an input signal, which is fed back from the controlled object such as a switch. In the mechanism and the ECU above, the input signal that is fed back into the ECU and that indicates the state of the controlled object has an abnormal value (for example, an input value may be indeterminate, or the input value may be fixed either at a high or low level) in an abnormal state due to a disconnection fault or the like in a feedback system. Consequently, a load driving device, which detects a disconnection of a load, has been proposed (for example, JP2001-037069A). According to this device, nevertheless, in an abnormal state of the feedback system wherein the input signal is fed back from the controlled object, the input value that represents an actual state of the controlled object is not inputted into the ECU.

Thus, in the abnormal state of the feedback system, in which the input signal is fed back from the controlled object, although the controlled object is actually controlled properly and is in an appropriate state, yet the input value that represents the different state from the actual state of the controlled object is inputted into the ECU. Accordingly, it is possible that the ECU cannot control an apparatus including the controlled object as the users expect, and that the apparatus may operate improperly on its own resultantly.

SUMMARY OF THE INVENTION

The present invention addresses the above disadvantages. Thus, it is a first objective of the present invention to provide an alternative input control method and an alternative input control device. A state of a battery supply voltage is monitored by the alternative input control method and the alternative input control device. Besides, a previously stored input value or an assumed input value obtained from internal control information, which is stored in any one of ECUs, is alternatively inputted into the ECU.

In addition to the first objective, it is a second objective of the present invention to provide an alternative input control method and an alternative input control device. An abnormal state of a feedback system of a controlled object, an output to which is controlled by an ECU, is determined by the alternative input control method and the alternative input control device according to the second objective. As well, an actual state of the controlled object is assumed based on internal control information stored in any one of ECUs, and an assumed input value that shows the assumed state is alternatively inputted into the ECU.

To achieve the first objective of the present invention, there is provided an electronic control unit, which on-off controls a controlled object. The electronic control unit determines whether a battery supply voltage is equal to or higher than a defined voltage. The electronic control unit includes one of the following operations if the battery supply voltage is lower than the defined voltage. That is, the electronic control unit sets an input value at an ON value that indicates the controlled object is turned on based on control signal information, if the electronic control unit is outputting a control signal to turn on the controlled object. The electronic control unit sets the input value at an OFF value that indicates the controlled object is turned off based on the control signal information, if the electronic control unit is outputting the control signal to turn off the controlled object.

To achieve the second objective of the present invention, there is provided an electronic control unit, which controls a controlled object. Based on an input signal that is fed back from the controlled object, the electronic control unit determines whether or not a feedback system of the controlled object is in an abnormal state. The electronic control unit includes the following operations if the feedback system is determined to be in the abnormal state. That is, the electronic control unit assumes a state of the controlled object based on internal control information stored in any one of the electronic control units, and the assumed state of the controlled object is alternatively inputted into the electronic control unit.

BRIEF DESCRIPTION OF THE DRAWINGS

The invention, together with additional objectives, features and advantages thereof, will be best understood from the following description, the appended claims and the accompanying drawings. In the drawings:

DETAILED DESCRIPTION OF THE INVENTION

Embodiments of the present invention will be described below with reference to the accompanying drawings.

First Embodiment

Figure 1:
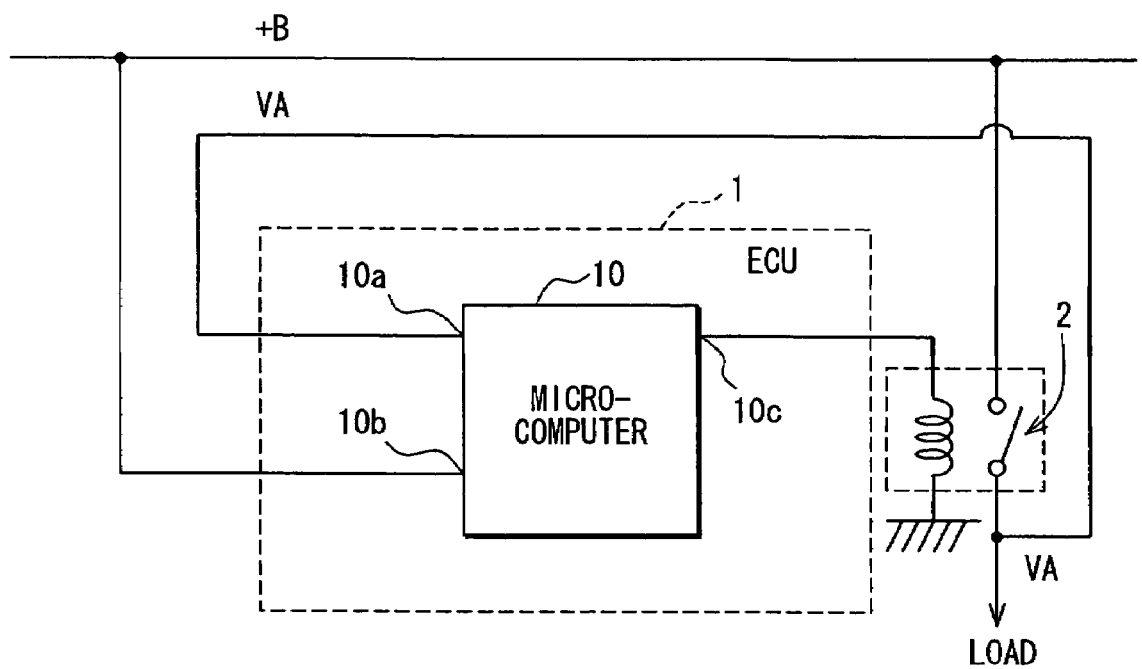
FIG. 1 is a circuit block diagram that indicates an alternative input control device, to which an alternative input control method is applied according to a first embodiment of the present invention.
Figure 3:
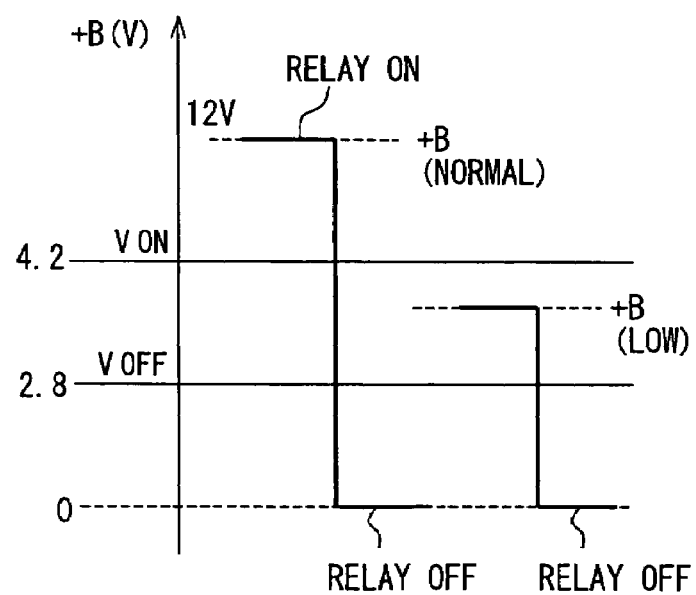
FIG. 3 is a voltage diagram that illustrates an operation of a conventional alternative input control method.

As shown in FIG. 1, an alternative input control device, in which an alternative input control method according to a first embodiment is employed, includes an electronic control unit (ECU) 1 and a relay 2, which is connected to a relay load (not shown). The ECU 1 includes a microcomputer 10. The relay 2 is on-off controlled by a relay control signal produced from the microcomputer 10.

The microcomputer 10 has a widely known configuration that includes a CPU (an central processing unit: not shown), a ROM (a read only memory: not shown), a RAM (a random access memory: not shown) and the like. The microcomputer 10 determines the battery supply voltage +B and sets a normal input value and an alternative input value through the CPU executing a program that is stored in the ROM.

The microcomputer 10 includes a relay voltage input terminal 10a, a battery supply voltage monitor terminal 10b, and a relay control signal output terminal 10c. The relay voltage input terminal 10a inputs an input voltage VA into the microcomputer 10 from one end (a relay load side end) of a relay switch of the relay 2. The battery supply voltage monitor terminal 10b inputs the battery supply voltage +B into the microcomputer 10. The relay control signal output terminal 10c outputs the relay control signal, which on-off controls the relay 2.

The relay 2 feeds power to the relay load that includes accessories such as a car audio and a car navigation system. The one end (the relay load side end) of the relay switch of the relay 2 is connected to the relay voltage input terminal 10a of the microcomputer 10.

Figure 2:
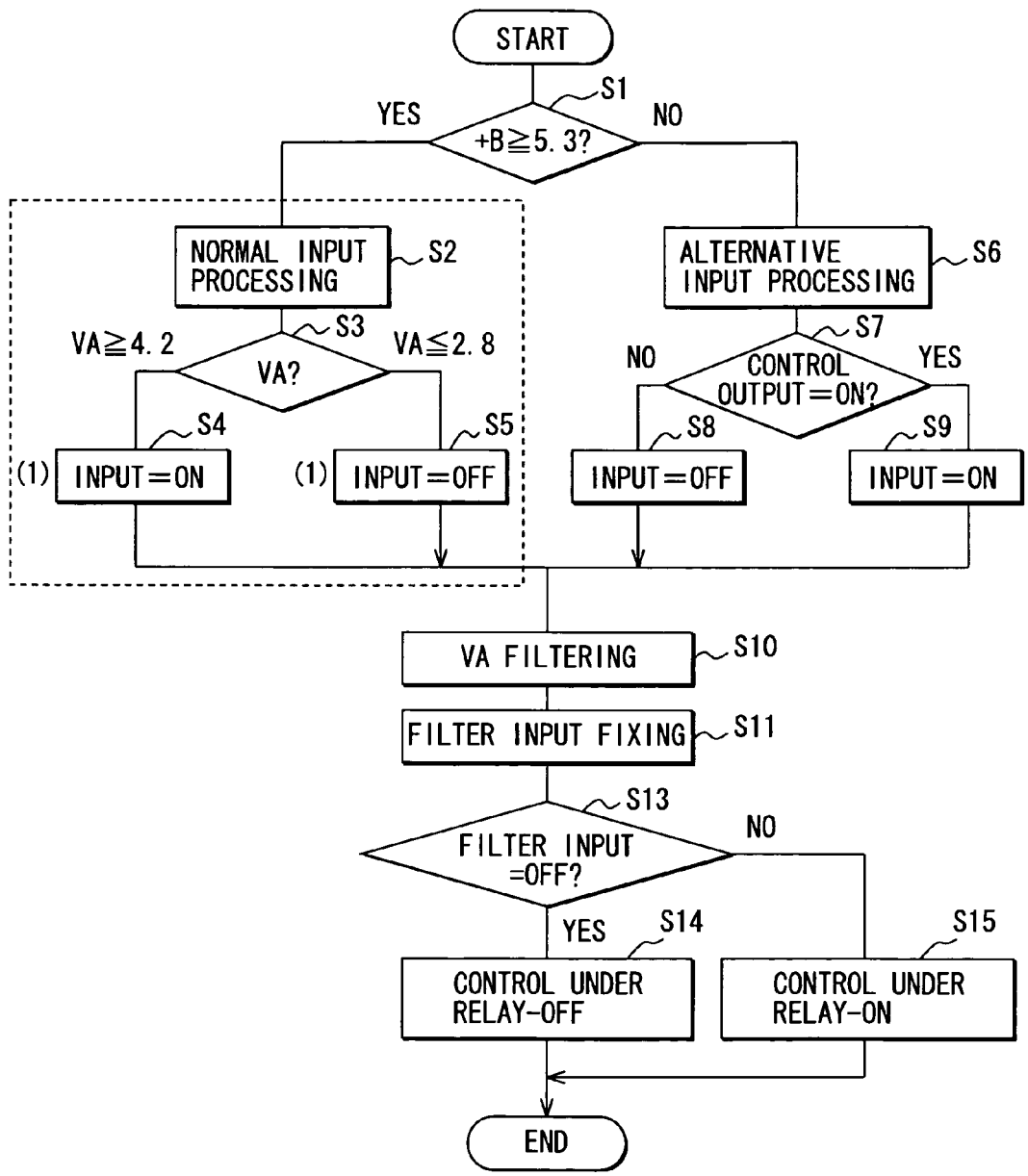
FIG. 2 is a flowchart that indicates basic processing according to the first embodiment.
Figure 2A:
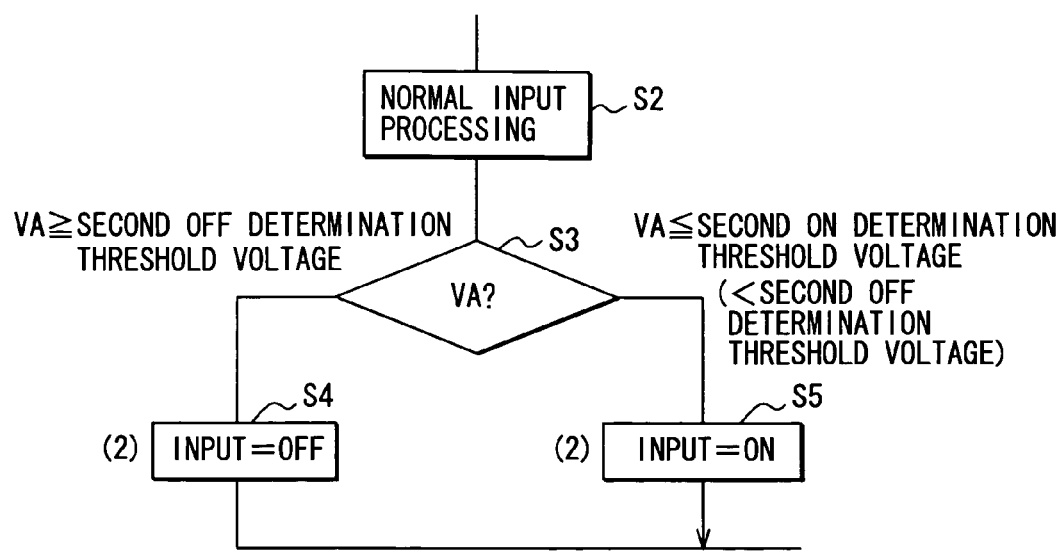
FIG. 2A is a flowchart that indicates basic processing according to an alternative to the first embodiment.

An operation of the microcomputer 10 of the first embodiment will be described below with reference to a flowchart in FIG. 2.

When input processing of a relay voltage is started, the microcomputer 10 determine whether the battery supply voltage +B, which is inputted into the battery supply voltage monitor terminal 10b, is equal to or higher than a defined voltage (i.e., 5.3V) (step S1). At this point, it is not yet determined whether or not the battery supply voltage +B between an OFF determination threshold voltage $V_{OFF}$ (i.e., 2.8 V) and an ON determination threshold voltage $V_{ON}$ (i.e., 4.2 V) is in a state of a low voltage.

If the battery supply voltage +B is equal to or higher than the defined voltage (5.3V) (i.e., normal) (S1), the microcomputer 10 carries out normal input processing (S2). More specifically, the microcomputer 10 determines the input voltage VA, which is inputted into the relay voltage input terminal 10a (S3). If the input voltage VA is determined to be equal to or higher than the ON determination threshold voltage $V_{ON}$ (4.2 V), the microcomputer 10 sets an input value at an ON value, which indicates that the relay 2 is turned on (S4). If the microcomputer 10 determines the input voltage VA to be equal to or lower than the OFF determination threshold voltage $V_{OFF}$ (2.8 V), the microcomputer 10 sets the input value at an OFF value, which indicates that the relay 2 is turned off (S5).

If the battery supply voltage +B is less than 5.3V (i.e., the low voltage) (S1), the microcomputer 10 performs alternative input processing (S6). More specifically, the microcomputer 10 outputs the relay control signal, whereby the relay load is controlled through on-off control over the relay 2. Based on information (ECU internal control information) about this relay control signal, the microcomputer 10 sets the present state (ON or OFF) of the relay 2 at an assumed input value (S7). For example, if the microcomputer 10 is outputting an OFF signal as the relay control signal, the relay 2 is assumed to be turned off. Thus, the microcomputer 10 sets a value of the input voltage VA, which is inputted into the relay voltage input terminal 10a, at the OFF value that indicates the relay 2 is turned off (S8). If the microcomputer 10 is outputting an ON signal as the relay control signal, the relay 2 is assumed to be turned on. Therefore, the microcomputer 10 sets the input value of the input voltage VA at the ON value that indicates the relay 2 is turned on (S9).

In order to provide an application program (not shown) with a stable input, the microcomputer 10 filters (S10) the input voltage VA that has been inputted into the relay voltage input terminal 10a, and fixes a filter input value at ON or OFF (S11). For instance, the input voltage VA may be inputted into the microcomputer 10 at intervals of 5 ms (milliseconds). When the above inputs have the same results eight consecutive times, the filter input value is fixed at either ON or OFF. Through this processing, an erroneous determination due to noise is restrained.

The microcomputer 10 determines the filter input value that has been fixed (S13), and controls an apparatus through execution of its application program according to a result (OFF or ON) of the determination (S14, S15).

The microcomputer 10 alternatively inputs information (a previously stored input value) before falling into an abnormal state. Also, the microcomputer 10 alternatively inputs the assumed input value based on the internal control information, which is stored in any one of ECUs. The information before falling into an abnormal state or the assumed input value is alternatively inputted into the relay voltage input terminal 10a, which erroneously determines and incorrectly inputs in the state of the low voltage. Consequently, an alternative input value that more accurately represents an actual state of a vehicle can be obtained. As a result, controls over the relay 2, which will live up to users' expectations, are possible as compared to the conventional erroneous determination and incorrect inputs.

In order to control the relay 2, ON/OFF determination of the relay 2, which is determined to be turned off, has been described in the present embodiment, provided that a level of the input voltage VA that is fed back into the relay voltage input terminal 10a is low (i.e., less than the defined voltage: 5.3V). Alternatively, similar ON/OFF determination can be employed for a relay that is determined to be turned on, when the level of the input voltage VA is high.

Second Embodiment

Figure 4:
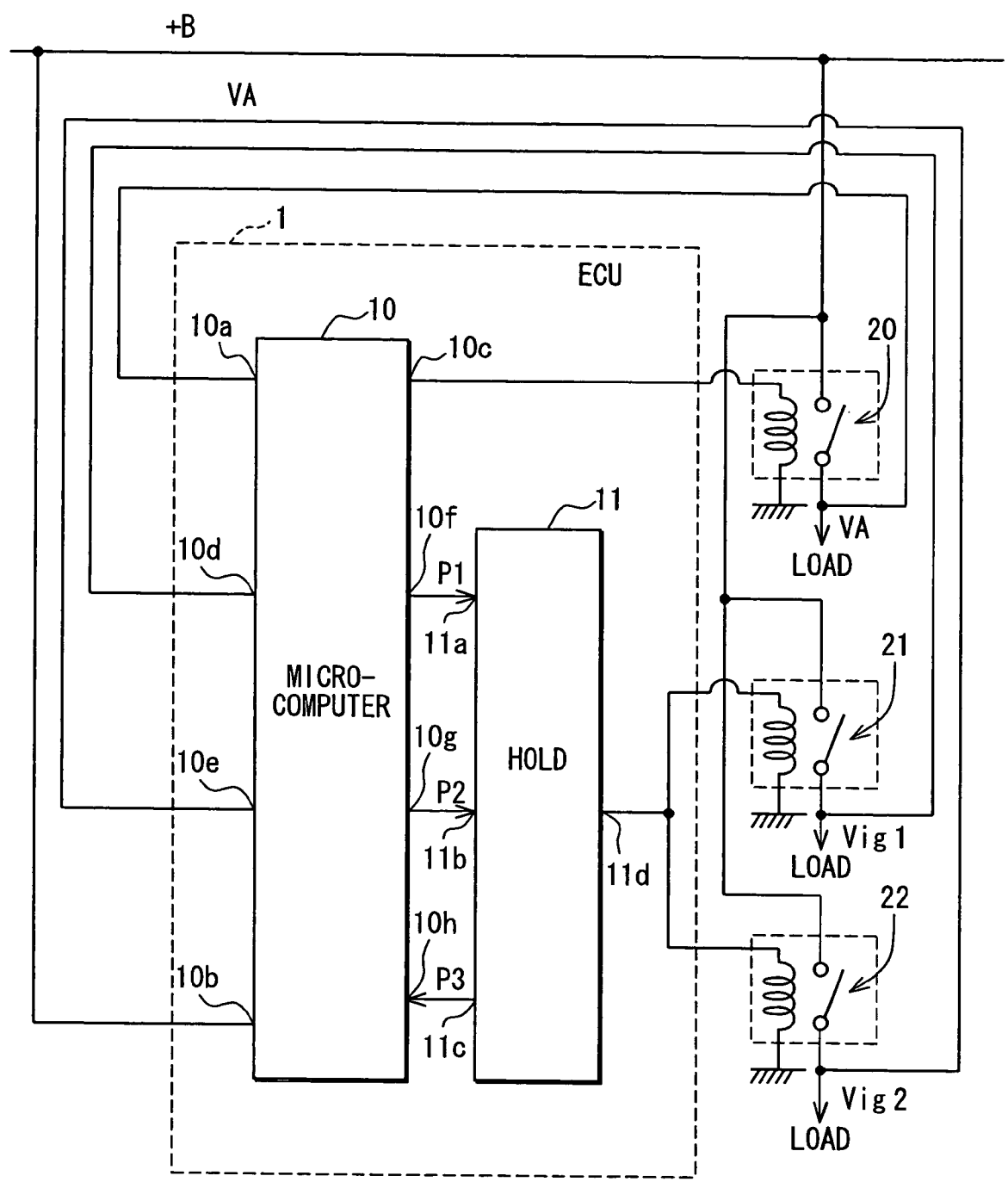
FIG. 4 is a circuit block diagram that indicates an alternative input control device, to which an alternative input control method is applied according to a second embodiment of the present invention.

As shown in FIG. 4, a circuit of the alternative input control device according to a second embodiment of the present invention includes an ECU 1, an accessory relay 20, a first ignition relay 21, and a second ignition relay 22. The ECU 1 includes a microcomputer 10 and a hold circuit 11. The accessory relay 20 is on-off controlled by an accessory relay control signal produced from the microcomputer 10. The first and second ignition relays 21, 22 are on-off controlled by an ignition relay control signal produced from the hold circuit 11. The microcomputer 10 has a widely known configuration that includes the CPU (not shown), the ROM (not shown), the RAM (not shown) and the like. The alternative input control method according to the present embodiment is realized through the CPU executing a program that is stored in the ROM.

The microcomputer 10 has an accessory relay voltage input terminal 10a, a battery supply voltage monitor terminal 10b, an accessory relay control signal output terminal 10c, a first ignition relay voltage input terminal 10d, a second ignition relay voltage input terminal 10e, a hold pulse signal output terminal 10f, a cancel pulse signal output terminal 10g, and a hold circuit status signal input terminal 10h.

The accessory relay voltage input terminal 10a inputs the input voltage VA into the microcomputer 10 from one end (an accessory relay load side end) of a relay switch of the accessory relay 20. The battery supply voltage monitor terminal 10b inputs the battery supply voltage +B into the microcomputer 10. The accessory relay control signal output terminal 10c outputs an accessory relay control signal, whereby the accessory relay 20 is on-off controlled. The first ignition relay voltage input terminal 10d inputs an input voltage $V_{ig}1$ into the microcomputer 10 from one end (a first ignition relay load side end) of a relay switch of the first ignition relay 21. The second ignition relay voltage input terminal 10e inputs an input voltage $V_{ig}2$ into the microcomputer 10 from one end (a second ignition relay load side end) of a relay switch of the second ignition relay 22.

The hold pulse signal output terminal 10f outputs a hold pulse signal P1 to the hold circuit 11. The cancel pulse signal output terminal 10g outputs a cancel pulse signal P2 to the hold circuit 11. The hold circuit status signal input terminal 10h inputs a hold circuit status signal (a signal that indicates a hold set status or a cancel status) P3 of the hold circuit 11 into the microcomputer 10.

The hold circuit 11 includes a hold pulse signal input terminal 11a, a cancel pulse signal input terminal 11b, a hold circuit status signal output terminal 11c, and an ignition control signal output terminal 11d. The hold pulse signal input terminal 11a inputs the hold pulse signal P1, which has been outputted from the hold pulse signal output terminal 10f of the microcomputer 10. The cancel pulse signal input terminal 11b inputs the cancel pulse signal P2, which has been outputted from the cancel pulse signal output terminal 10g of the microcomputer 10. The hold circuit status signal output terminal 11c outputs the hold circuit status signal P3, which will be inputted into the hold circuit status signal input terminal 10h of the microcomputer 10. The ignition control signal output terminal 11d outputs an ignition control signal to the first and second ignition relays 21, 22.

The hold circuit 11 generates a hold trigger signal, when the hold pulse signal P1, which has been produced from the microcomputer 10, is inputted into the hold circuit 11. In this case, the hold circuit 11 starts to provide the ignition relay control signal, which is a control signal (a drive current) that will on-off control the first and second ignition relays 21, 22. The hold circuit 11 continues to provide the ignition relay control signal, namely a current that drives the first and second ignition relays 21, 22, even after the hold trigger signal disappears.

The hold circuit 11 generates a cancel trigger signal, when the cancel pulse signal P2, which has been produced from the microcomputer 10, is inputted. In this case, the hold circuit 11 stops providing the ignition relay control signal, which is the control signal (the drive current) that will on-off control the first and second ignition relays 21, 22. As a consequence, when the hold pulse signal P1 from the microcomputer 10 is inputted into the hold circuit 11 in a normal state where there is no influence of noise or the like, the hold circuit 11 starts to output the ignition relay control signal (i.e., an ignition relay control signal ON), whereby the first and second ignition relays 21, 22 will be turned on. Then, the hold circuit 11 continues to output the ignition relay control signal ON to the first and second ignition relays 21, 22 until the cancel pulse signal P2 from the microcomputer 10 is inputted.

The alternative input control device having the hold circuit 11 has advantages over, for instance, a configuration without the hold circuit 11, in which provision of the drive current (that drives the first and second ignition relays 21, 22) is controlled by a control signal from the microcomputer 10. In this configuration, when the control signal from the microcomputer 10 is turned off due to the noise or the like, power feeding will be readily stopped even in a state where the power should be continuously fed. It is possible that such a case happens while a vehicle is traveling. When the alternative input control device has the hold circuit 11, on the other hand, once the microcomputer 10 outputs the hold pulse signal P1, the hold circuit 11 continues to output the ignition relay control signal ON unless the microcomputer 10 outputs the cancel pulse signal P2. As a result, an unintentional power feeding failure while the vehicle is moving can be restrained.

The accessory relay 20 feeds power to an accessory relay load that includes the accessories such as the car audio and the car navigation system. The one end (the accessory relay load side end) of the relay switch of the accessory relay 20 is connected to the accessory relay voltage input terminal 10a of the microcomputer 10.

The first ignition relay 21 feeds the power to a first ignition relay load of a vehicle chassis such as an illumination and a power window. The one end (the first ignition relay load side end) of the relay switch of the first ignition relay 21 is connected to the first ignition relay voltage input terminal 10d of the microcomputer 10.

The second ignition relay 22 feeds the power to a second ignition relay load of a driving system such as an engine. The one end (the second ignition relay load side end) of the relay switch of the second ignition relay 22 is connected to the second ignition relay voltage input terminal 10e of the microcomputer 10.

With reference to flowcharts shown in FIGS. 5 to 7, an operation of the present embodiment will be described below.

Figure 5:
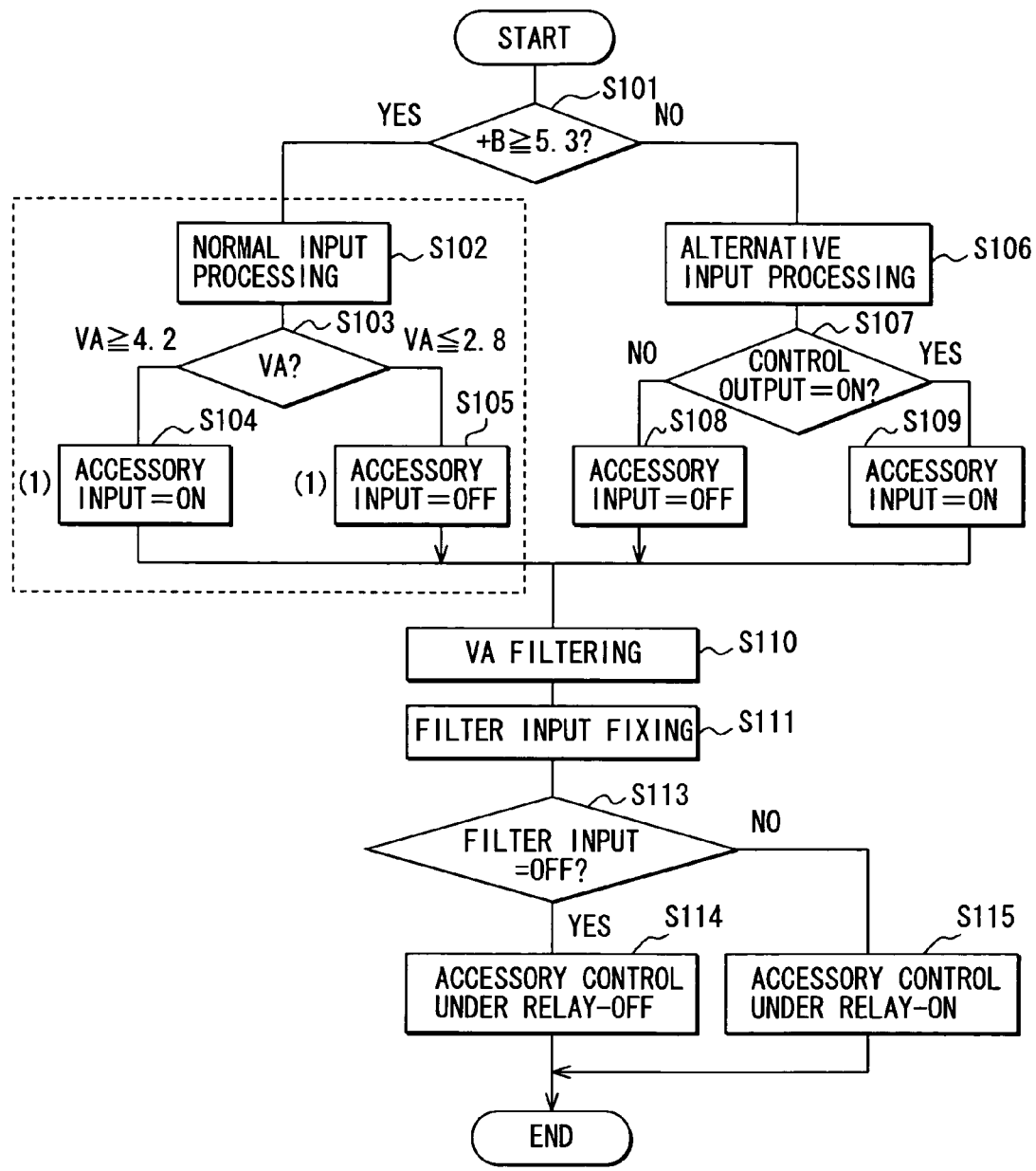
FIG. 5 is a flowchart that indicates input processing of an accessory input voltage according to the second embodiment.
Figure 5A:
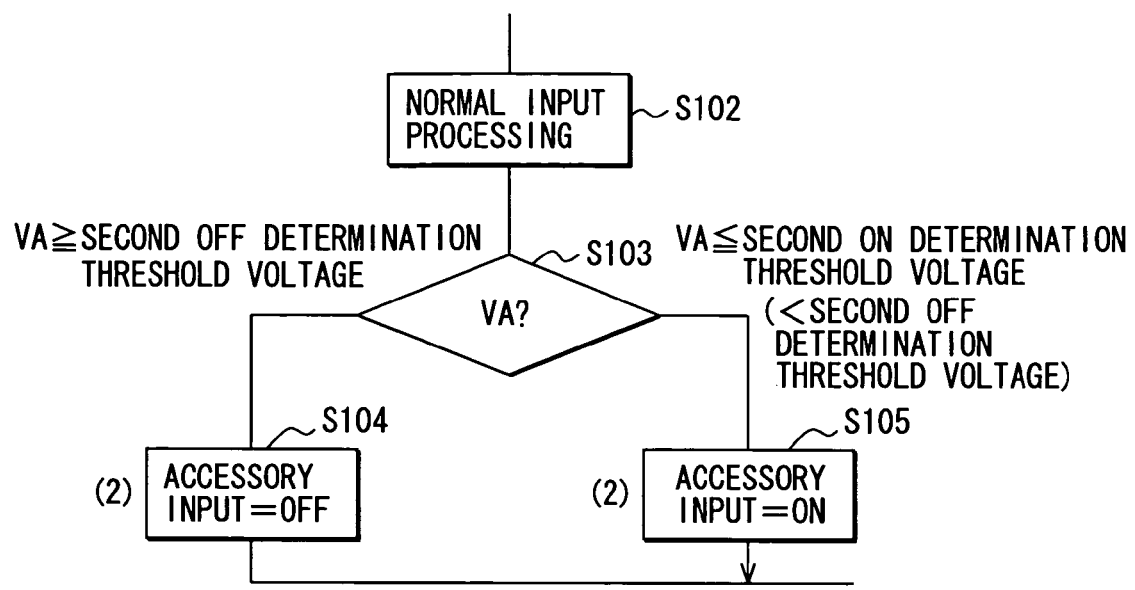
FIG. 5A is a flowchart that indicates input processing of an accessory input input voltage according to an alternative to the second embodiment.

(1) Accessory Relay 20 (FIG. 5)

The microcomputer 10 determine whether the battery supply voltage +B, which has been inputted into the battery supply voltage monitor terminal 10b, is equal to or higher than the defined voltage (i.e., 5.3V) (S101).

If the battery supply voltage +B is equal to or higher than the defined voltage (5.3V) (i.e., normal), the microcomputer 10 carries out normal input processing (S102). More specifically, the microcomputer 10 determines an accessory input voltage VA, which is inputted into the accessory relay voltage input terminal 10a (S103).

If the accessory input voltage VA is determined to be equal to or higher than the ON determination threshold voltage $V_{ON}$ (i.e., 4.2 V), the microcomputer 10 sets an input value of the accessory input voltage at an ON value that indicates the accessory relay 20 is turned on (S104). If the microcomputer 10 determines the accessory input voltage VA to be equal to or lower than the OFF determination threshold voltage $V_{OFF}$ (i.e., 2.8 V), the microcomputer 10 sets the input value of the accessory input voltage VA at an OFF value that indicates the accessory relay 20 is turned off (S105).

If the battery supply voltage +B is less than 5.3V (i.e., the low voltage) (S101), the microcomputer 10 performs the alternative input processing (S106). More specifically, the microcomputer 10 outputs the accessory relay control signal, whereby the accessory relay load is controlled through on-off control over the accessory relay 20. Based on information (the ECU internal control information) about this accessory relay control signal, the microcomputer 10 sets the present state (ON or OFF) of the accessory relay 20 at the assumed input value (S107).

For example, if the microcomputer 10 is outputting the OFF signal to the accessory relay 20 as the accessory relay control signal, the accessory relay 20 is assumed to be turned off. Thus, the microcomputer 10 sets a value of the accessory input voltage VA, which is inputted into the accessory relay voltage input terminal 10a, at the OFF value that indicates the accessory relay 20 is turned off (S108). If the microcomputer 10 is outputting the ON signal to the accessory relay 20 as the accessory relay control signal, the accessory relay 20 is assumed to be turned on. Therefore, the microcomputer 10 sets the input value of the accessory input voltage VA, which is inputted into the accessory relay voltage input terminal 10a, at the ON value that indicates the accessory relay 20 is turned on (S109).

In order to provide the application program (not shown) with the stable input, the microcomputer 10 filters (S110) the accessory input voltage VA that has been inputted into the accessory relay voltage input terminal 10a, and fixes an accessory filter input value at ON or OFF (S111). For instance, the accessory input voltage VA may be inputted into the microcomputer 10 at intervals of 5 ms (milliseconds). When the above inputs have the same results eight consecutive times, the accessory filter input value is fixed at either ON or OFF.

The microcomputer 10 determines the accessory filter input value, which has been fixed at step S111, to be ON or OFF (S113). Then, the microcomputer 10 controls the apparatus, on which a varying accessory relay load is imposed, through the execution of the application program of the apparatus according to the result (OFF or ON) of the determination (S114, S115).

Therefore, when an appropriate accessory input voltage VA cannot be inputted into the microcomputer 10 in the state where a level of the battery supply voltage +B is low, the input value that approximates a value in a normal battery power state can be obtained through the assumption of the alternative input value. The alternative input value is assumed based on the information (i.e., the internal control information about, which side (ON or OFF) of the accessory relay 20 the microcomputer 10 is outputting the accessory relay control signal to) about the accessory relay control signal of the ECU 1.

Figure 6:
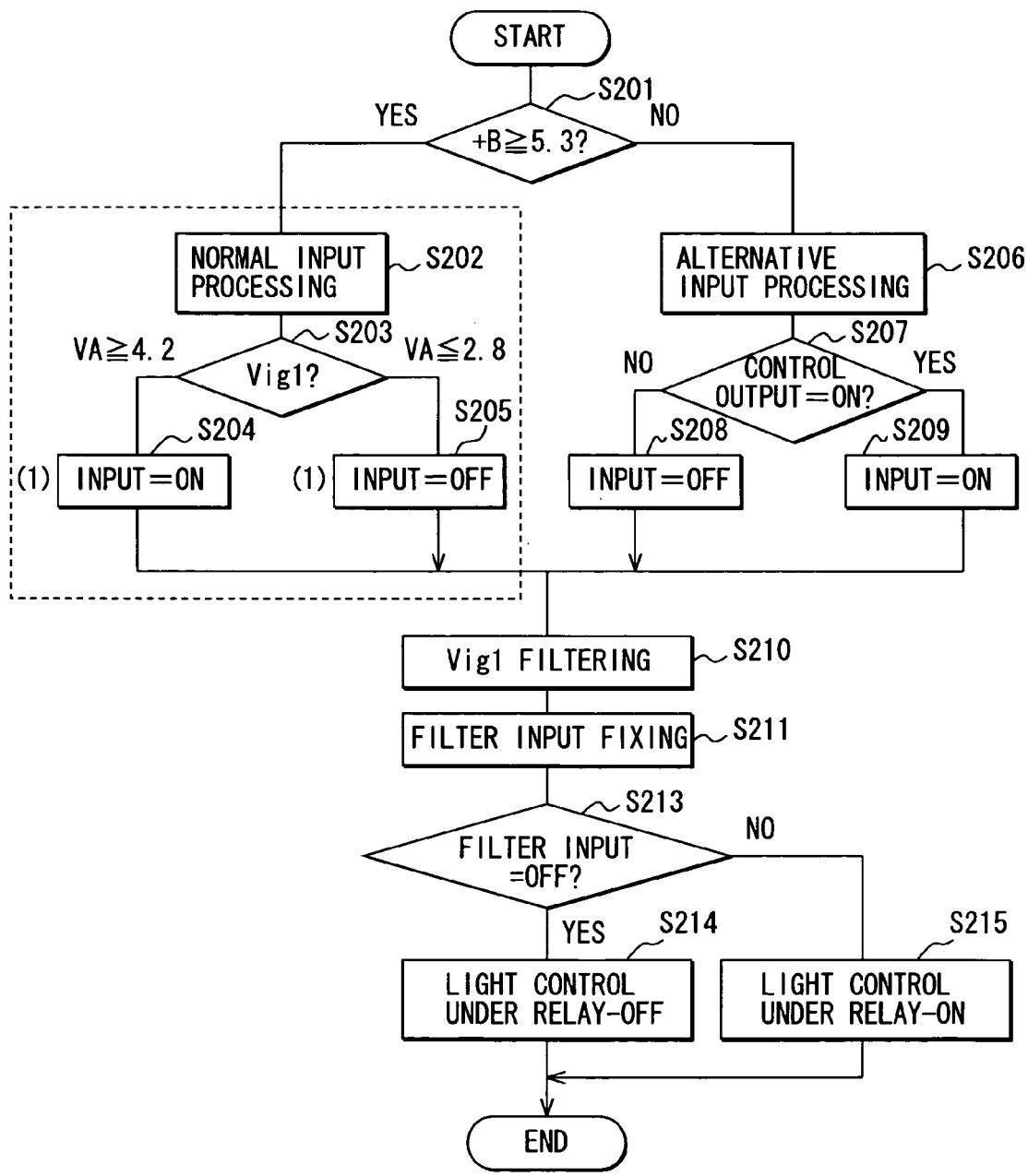
FIG. 6 is a flowchart that indicates input processing of a first ignition input voltage according to the second embodiment.
Figure 6A:
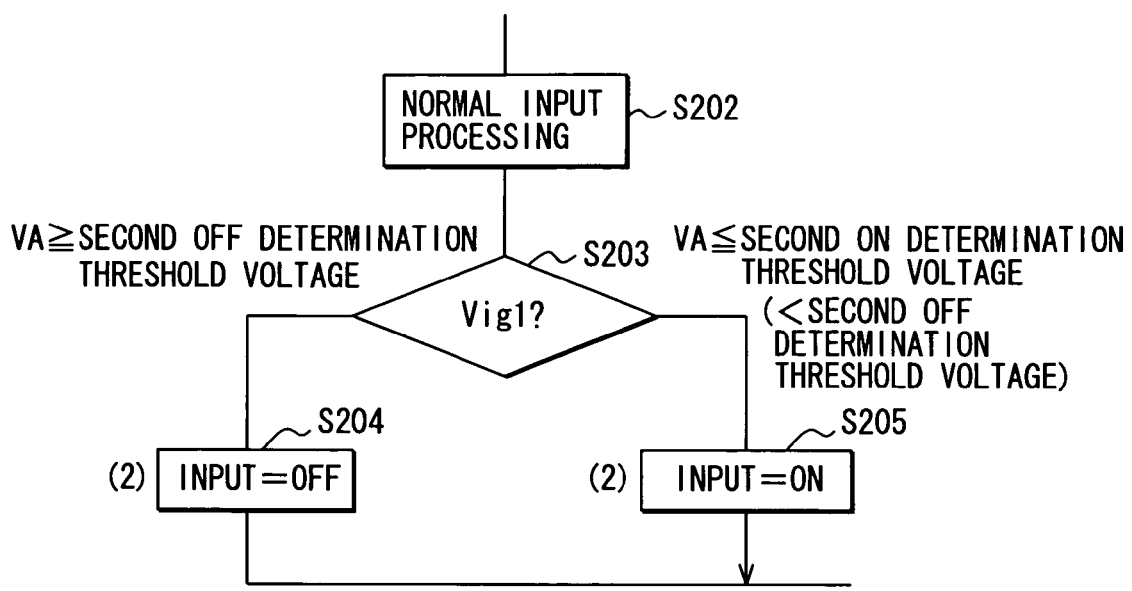
FIG. 6A is a flowchart that indicates input processing of a first ignition input voltage according to an alternative to the second embodiment.

(2) First Ignition Relay 21 (FIG. 6)

The microcomputer 10 determines whether or not the battery supply voltage +B, which has been inputted into the battery supply voltage monitor terminal 10b, is equal to or higher than the defined voltage (i.e., 5.3V) (S201).

If the battery supply voltage +B is equal to or higher than the defined voltage (5.3V) (i.e., a normal voltage) (S201), the microcomputer 10 carries out the normal input processing (S202). More specifically, the microcomputer 10 determines a first ignition input voltage $V_{ig}1$, which is inputted into the first ignition relay voltage input terminal 10d (S203). Then, if the first ignition input voltage $V_{ig}1$ is determined to be equal to or higher than the ON determination threshold voltage $V_{ON}$ (i.e., 4.2 V), the microcomputer 10 sets an input value of the first ignition input voltage $V_{ig}1$ at an ON value that indicates the first ignition relay 21 is turned on (S204). Meanwhile, if the microcomputer 10 determines the first ignition input voltage $V_{ig}1$ to be equal to or lower than the OFF determination threshold voltage $V_{OFF}$ (i.e., 2.8 V), the microcomputer 10 sets the input value of the first ignition input voltage $V_{ig}1$ at an OFF value that indicates the first ignition relay 21 is turned off (S205).

If the battery supply voltage +B is less than the defined voltage (5.3V) (i.e., the low voltage) (S201), the microcomputer 10 performs the alternative input processing (S206). More specifically, the ECU 1 (the hold circuit 11) outputs the ignition relay control signal, whereby the first ignition relay load is controlled through on-off control over the first ignition relay 21. Thus, the microcomputer 10 sets the present state (ON or OFF) of the first ignition relay 21 at the assumed input value, based on information (the ECU internal control information) about the ignition relay control signal (S207).

For example, if the ECU 1 (the hold circuit 11) is outputting the OFF signal to the first ignition relay 21 as the ignition relay control signal, the first ignition relay 21 is assumed to be turned off. Thus, the microcomputer 10 sets a value of the first ignition input voltage $V_{ig}1$, which is inputted into the first ignition relay voltage input terminal 10d, at the OFF value that indicates the first ignition relay 21 is turned off (S208). If the ECU 1 (the hold circuit 11) is outputting the ON signal to the first ignition relay 21 as the ignition relay control signal, the first ignition relay 21 is assumed to be turned on. Therefore, the microcomputer 10 sets the input value of the first ignition input voltage $V_{ig}1$, which is inputted into the first ignition relay voltage input terminal 10d, at the ON value that indicates the first ignition relay 21 is turned on (S209).

The microcomputer 10 filters (S210) the first ignition input voltage $V_{ig}1$ that has been inputted into the first ignition relay voltage input terminal 10d, and fixes a first ignition filter input value at ON or OFF (S211), so that the application program (not shown) is provided with the stable input. For instance, the first ignition input voltage $V_{ig}1$ may be inputted into the microcomputer 10 at intervals of 5 ms (milliseconds). When the above inputs have the same results eight consecutive times, the first ignition filter input value is fixed at either ON or OFF.

The microcomputer 10 determines the first ignition filter input value to be ON or OFF (S213), and controls a light differently according to the result (OFF or ON) of the determination, imposing a varying first ignition relay load on the light (S214, S215). For example, a dome lamp may be turned on at S214.

Therefore, when an appropriate first ignition input voltage $V_{ig}1$ cannot be inputted into the microcomputer 10 in the state where the level of the battery supply voltage +B is low, the input value that approximates the value in the normal battery power state can be obtained through the assumption of the alternative input value. The alternative input value is assumed based on the information (i.e., the internal control information about, which side (ON or OFF) of the first ignition relay 21 the ECU 1 (the hold circuit 11) is outputting the ignition relay control signal to) about the ignition relay control signal of the ECU 1.

Figure 7:
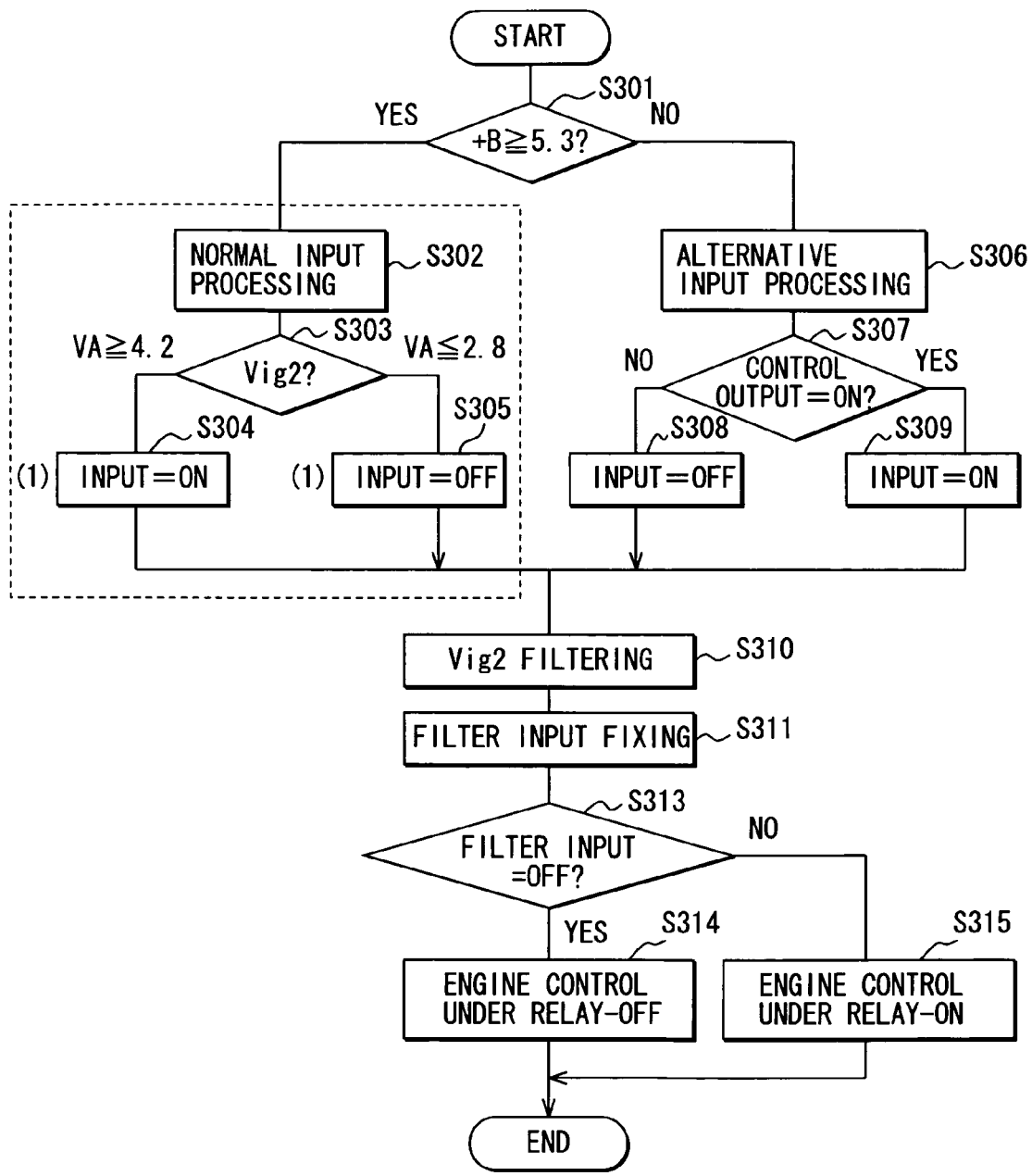
FIG. 7 is a flowchart that indicates input processing of a second ignition input voltage according to the second embodiment.
Figure 7A:
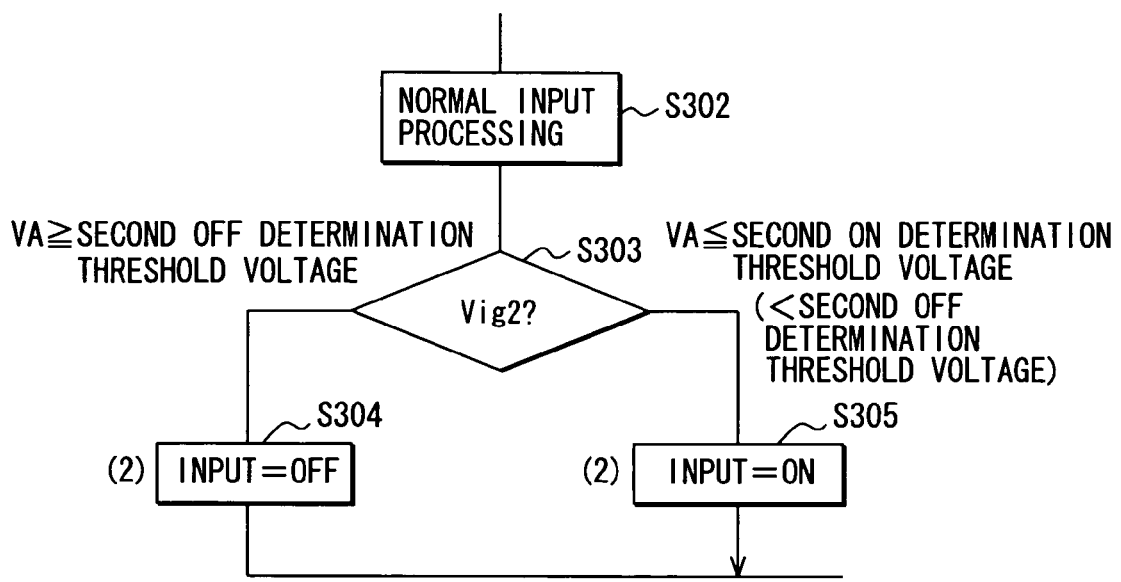
FIG. 7A is a flowchart that indicates input processing of a second ignition input voltage according to an alternative to the second embodiment.

(3) Second Ignition Relay 22 (FIG. 7)

The microcomputer 10 determines whether the battery supply voltage +B, which has been inputted into the battery supply voltage monitor terminal 10b, takes the value of the defined voltage (i.e., 5.3V) or higher (S301).

If the battery supply voltage +B is equal to or higher than the defined voltage (5.3V) (i.e., the normal voltage) (S301), the microcomputer 10 carries out the normal input processing (S302).

More specifically, the microcomputer 10 determines a second ignition input voltage $V_{ig}2$, which has been inputted into the second ignition relay voltage input terminal 10e (S303). Then, if the second ignition input voltage $V_{ig}2$ is determined to be equal to or higher than the ON determination threshold voltage $V_{ON}$ (i.e., 4.2 V), the microcomputer 10 sets the input value of the second ignition input voltage $V_{ig}2$ at an ON value that indicates the second ignition relay 22 is turned on (S304).

Meanwhile, if the microcomputer 10 determines the second ignition input voltage $V_{ig}2$ to be equal to or lower than the OFF determination threshold voltage $V_{OFF}$ (i.e., 2.8 V), the microcomputer 10 sets the input value of the second ignition input voltage $V_{ig}2$ at an OFF value that indicates the second ignition relay 22 is turned off (S305).

If the battery supply voltage +B is less than the defined voltage (5.3V) (i.e., the low voltage) (S301), the microcomputer 10 performs the alternative input processing (S306). More specifically, because the ECU 1 (the hold circuit 11) outputs the ignition relay control signal, whereby the second ignition relay load is controlled through on-off control over the second ignition relay 22. Hence, the microcomputer 10 sets the present state (ON or OFF) of the second ignition relay 22 at the assumed input value, based on the information (the ECU internal control information) about the ignition relay control signal (S307).

For example, if the ECU 1 (the hold circuit 11) is outputting the OFF signal to the second ignition relay 22 as the ignition relay control signal, the second ignition relay 22 is assumed to be turned off. Thus, the microcomputer 10 sets a value of the second ignition input voltage $V_{ig}2$, which is inputted into the second ignition relay voltage input terminal 10e, at the OFF value that indicates the second ignition relay 22 is turned off (S308). If the ECU 1 (the hold circuit 11) is outputting the ON signal to the second ignition relay 22 as the ignition relay control signal, the second ignition relay 22 is assumed to be turned on. Therefore, the microcomputer 10 sets the input value of the second ignition input voltage $V_{ig}2$, which is inputted into the second ignition relay voltage input terminal 10e, at the ON value that indicates the second ignition relay 22 is turned on (S309).

The microcomputer 10 filters (S310) the second ignition input voltage $V_{ig}2$ that has been inputted into the second ignition relay voltage input terminal 10e, and fixes a second ignition filter input value at ON or OFF (S311), in order that the application program (not shown) is provided with the stable input. For instance, the second ignition input voltage $V_{ig}2$ may be inputted into the microcomputer 10 at intervals of 5 ms (milliseconds). When the above inputs have the same results eight consecutive times, the second ignition filter input value is fixed at either ON or OFF.

The microcomputer 10 determines the second ignition filter input value to be ON or OFF (S313), and controls the engine differently according to the result (OFF or ON) of the determination, imposing a varying second ignition relay load on the engine (S314, S315).

Therefore, when an appropriate second ignition input voltage $V_{ig}2$ cannot be inputted into the microcomputer 10 in the state where the level of the battery supply voltage +B is low, the input value that approximates the value in the normal battery power state can be obtained through the assumption of the alternative input value. The alternative input value is assumed based on the information (i.e., the internal control information about, which side (ON or OFF) of the second ignition relay 22 the ECU 1 (the hold circuit 11) is outputting the ignition relay control signal to) about the ignition relay control signal of the ECU 1.

When voltage levels of the input voltage VA, the first ignition input voltage $V_{ig}1$ and the second ignition input voltage $V_{ig}2$, which are fed back respectively into the accessory relay voltage input terminal 10a, the first ignition relay voltage input terminal 10d, and the second ignition relay voltage input terminal 10e, are low (i.e., less than the defined voltage: 5.3V), ON/OFF determination of the relay 2, which is determined to be turned off, has been described in the present embodiment (in (1) the accessory relay 20, (2) the first ignition relay 21, and (3) the second ignition relay 22 respectively). Alternatively, it is apparent that similar ON/OFF determination can be employed for a relay that is determined to be turned on when the levels of the above three voltages are high.

In the present embodiment, the microcomputer 10 determines whether the battery supply voltage +B is low. Even if the level of the battery supply voltage +B is low, the alternative input value that accurately represents the actual state of a vehicle can be obtained through the alternative input processing. Consequently, the erroneous determinations and the incorrect inputs of input values of the input voltages can be restrained, thereby providing users with control over relays, which will live up to their expectations.

Third Embodiment

Figure 8:
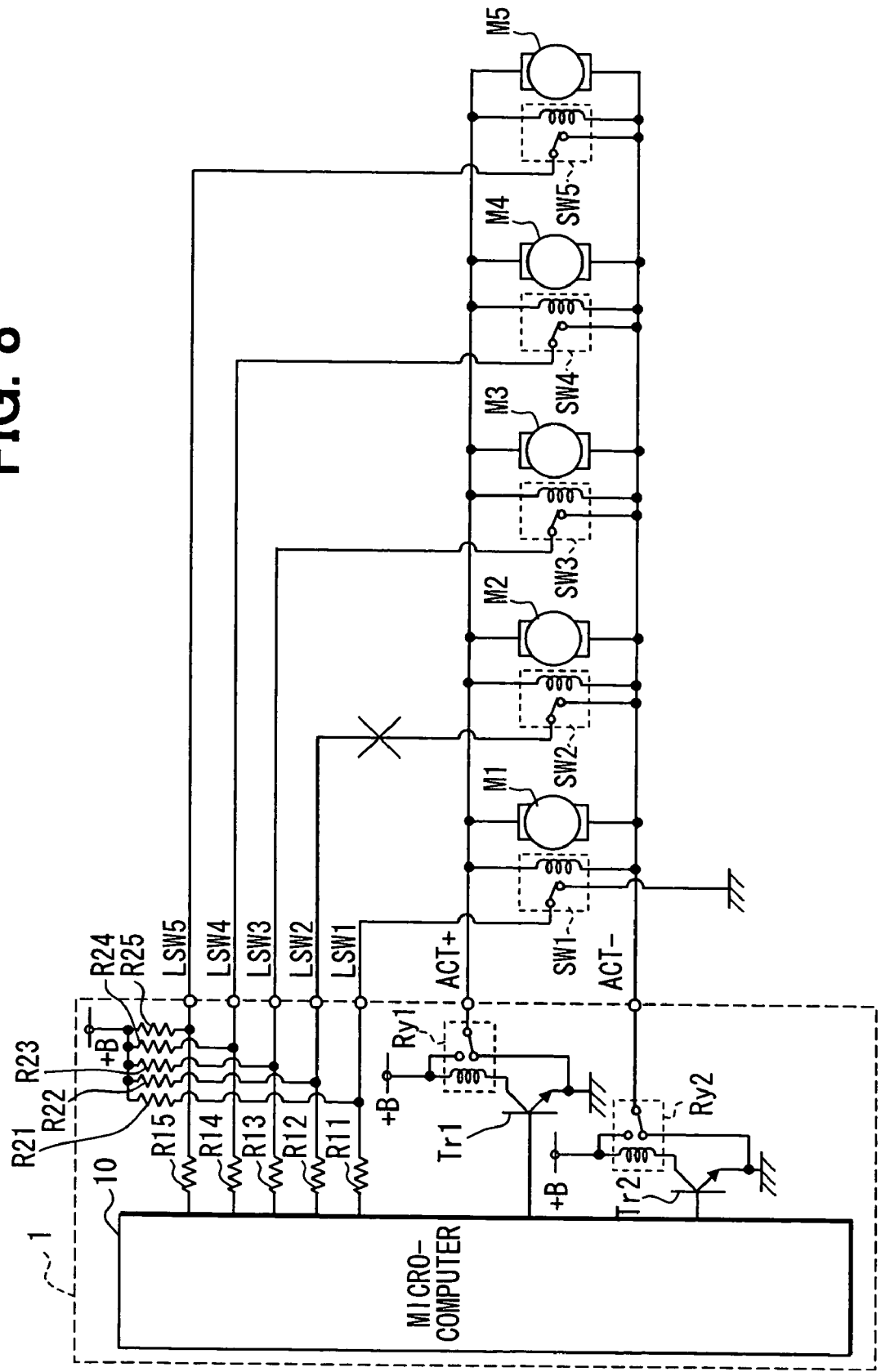
FIG. 8 is a circuit block diagram that indicates a door lock control device, to which an alternative input control method is applied according to a third embodiment of the present invention.

As shown in FIG. 8, a door lock control device in a third embodiment mainly includes an ECU1, door lock motors M1 to M5, and door lock position switches SW1 to SW5. The door lock motors M1 to M5 are connected to the ECU 1. The door lock position switches SW1 to SW5 detect lock positions of door locks activated with the aid of the door lock motors M1 to M5.

The ECU 1 includes a microcomputer 10, transistors $T_r1$, $T_r2$, relay switches $R_y1$, $R_y2$, input resistances R11 to R15, and pull-up resistors R21 to R25.

The microcomputer 10 performs abnormity determination and alternative input, which will be described below.

The microcomputer 10 is connected to a control output terminal ACT+ of the ECU 1 via the transistor $T_r1$ and the relay $R_y1$. The microcomputer 10 is also connected to a control output terminal ACT– of the ECU 1 via the transistor $T_r2$ and the relay $R_y2$. Furthermore, the microcomputer 10 is connected to door lock position signal input terminals LSW1 to LSW5 via the input resistances R11 to R15 respectively. A battery power supply voltage +B is applied to the door lock position signal input terminals LSW1 to LSW5 via the pull-up resistors R21 to R25 respectively.

The door lock motors M1 to M5 are connected in parallel between the control output terminal ACT+ and the control output terminal ACT–. The door lock motors M1 to M5 are used for locking or unlocking corresponding vehicular door lock mechanisms (not shown) of a driver's seat door, a passenger seat door, a right rear door, a left rear door, and a hatchback door (a trunk door) respectively.

The door lock position switches SW1 to SW5 are interlocked with the corresponding door lock mechanisms, which are driven by the door lock motors M1 to M5 respectively. Fixed terminals of the door lock position switches SW1 to SW5 are respectively connected to the door lock position signal input terminals of the ECU 1, namely LSW1 to LSW5. The other switching terminals of the door lock position switches SW1 to SW5 are grounded.

Figure 9:
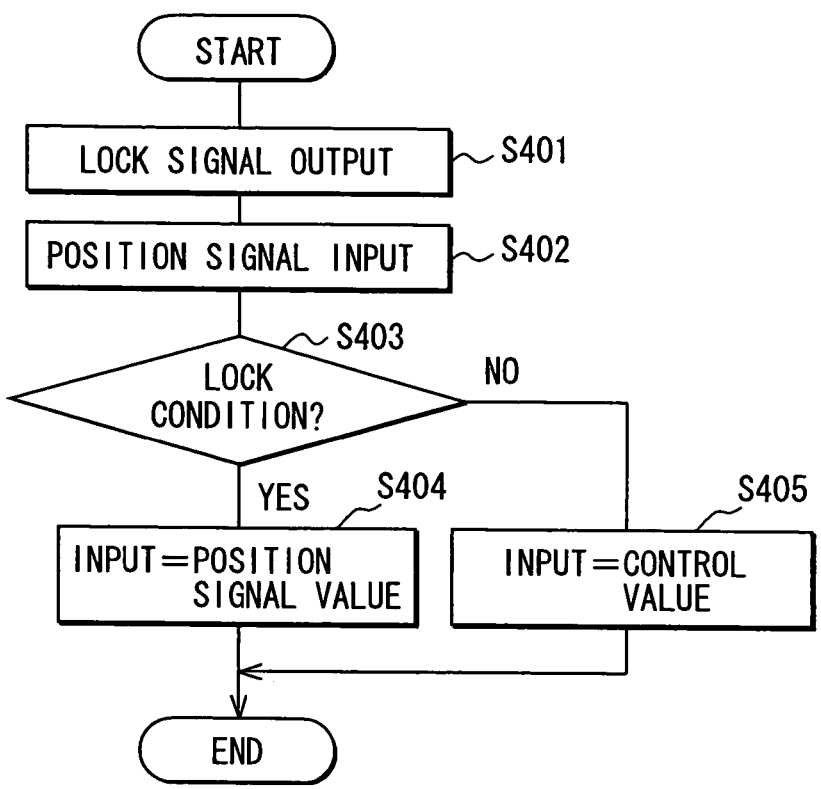
FIG. 9 is a flowchart that indicates door lock output processing according to the third embodiment.
Figure 10:
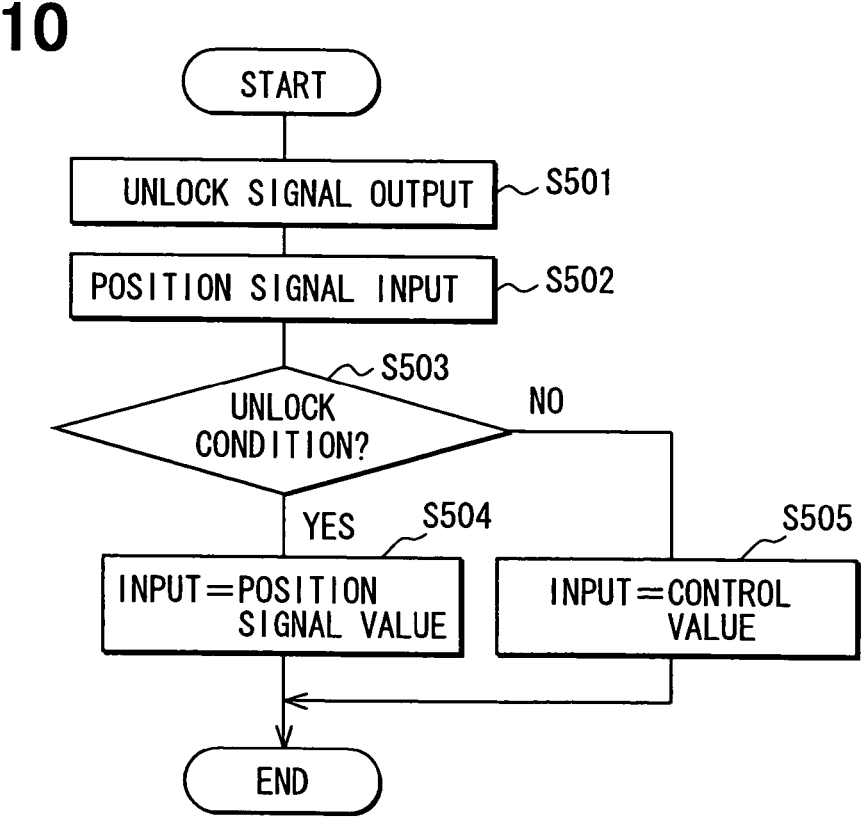
FIG. 10 is a flowchart that indicates door unlock output processing according to the third embodiment.

With reference to FIGS. 8 to 10, operations of the alternative input control method that has the above configuration according to the third embodiment will be described below. In the present embodiment, as one of the alternative inputs in an abnormal state of a feedback system, the alternative input of the assumed input value that shows a state of the door lock position during a wiring fault will be considered, for example.

When the ECU 1 outputs a door lock control signal to the door lock motors M1 to M5 (S401 in FIG. 9), the door lock motors M1 to M5 are activated, thereby locking doors through the door lock mechanisms.

More specifically, as shown in FIG. 8, the microcomputer 10 turns on the transistor $T_r1$. Then, the relay $R_y1$ is energized, and the battery power supply voltage +B is applied to the control output terminal ACT+. Meanwhile, the transistor $T_r2$ is left turned off, and thus the control output terminal ACT– is left at the ground voltage level. As a consequence, an electrical current flows from the control output terminal ACT+ to the control output terminal ACT–. Accordingly, the door lock motors M1 to M5 are energized in the forward direction, thereby locking the doors through driving the door lock mechanisms. Each of the door lock position switches SW1 to SW5 has the switching terminal and the fixed terminal, which are connected when the corresponding door lock position switch (SW1-SW5) is turned on. The switching terminals are grounded. The fixed terminals of the door lock position switches SW1 to SW5 are respectively connected to the door lock position signal input terminals LSW1 to LSW5.

Each of the door lock position switches SW1 to SW5 is turned on when its fixed terminal is connected to the corresponding switching terminal. Thereafter, a door lock position signal (the ground voltage level) that is produced from each of the door lock position switches SW1 to SW5 is inputted into the microcomputer 10 through the corresponding door lock position signal input terminal (LSW1-LSW5) and the corresponding input resistance (R11-R15) (S402).

In a normal state where there is no disconnection fault or the like, each of the door lock position signal input terminals LSW1 to LSW5 is at the ground voltage level. As a result, the microcomputer 10 determines the door to be locked (S403: YES), after the corresponding door lock position signal at the ground voltage level is fed back from the corresponding door lock position switch (SW1-SW5). Then, the ground voltage level of the door lock position signal is inputted into the microcomputer 10 as an input value (S404).

In the abnormal state where the disconnection fault (indicated with X in FIG. 8) or the like occurs in the feedback system, the door lock position signal cannot be inputted into the microcomputer 10 normally. Thus, the ECU 1 assumes the present door lock position based on door lock output control information, which is the internal control information stored in any one of ECUs. Following this, the assumed input value (a control value) that shows the assumed door lock position is alternatively inputted into the microcomputer 10 of the ECU 1.

More specifically, in the abnormal state where the disconnection fault or the like occurs in the feedback system as shown in FIG. 8, even after the door lock position switches SW1 to SW5 (in FIG. 8, the door lock position switch SW2) are turned on (i.e., each fixed terminal that is connected to the corresponding door lock position signal input terminal (LSW1-LSW5) is connected to the corresponding switching terminal that is grounded), the door lock position signal input terminals LSW1 to LSW5 (in FIG. 8, the door lock position signal input terminal LSW2) are not at the ground voltage level. The door lock position signal input terminals LSW1 to LSW5 are left at a level of the battery power supply voltage +B. Therefore, the microcomputer 10 judges (S403: NO) the door lock position signal input terminals LSW1 to LSW5 (the door lock position signal input terminal LSW2) to not be at the ground voltage level, which indicates that the doors are locked. Based on the door lock output control information, which is the internal control information stored in any one of ECUs, the microcomputer 10 assumes that the door lock position should be changed into 'lock' after the door lock control signal is outputted. Subsequently, the assumed input value, which shows the assumed door lock position, is alternatively inputted into the microcomputer 10 (S405).

When the ECU1 outputs door unlock control signals to the door lock motors M1 to M5 (S501 in FIG. 10), the door lock motors M1 to M5 are activated, thereby unlocking the doors through the door lock mechanisms.

More specifically, as shown in FIG. 8, the microcomputer 10 turns on the transistor $T_r2$. Then, the relay $R_y2$ is energized, and the battery power supply voltage +B is applied to the control output terminal ACT−. Meanwhile, the transistor T,1 is left turned off, and thus the control output terminal ACT+ is left at the ground voltage level. As a consequence, the electrical current flows from the control output terminal ACT− to the control output terminal ACT+. Accordingly, the door lock motors M1 to M5 are energized in a backward direction, thereby unlocking the doors through driving the door lock mechanisms. Next, the door lock position switches SW1 to SW5 are turned off (OPEN) (i.e., each fixed terminal that is connected to the corresponding door lock position signal input terminal (LSW1-LSW5) is disconnected from the corresponding switching terminal that is grounded).

When the door lock position switches SW1 to SW5 are turned off, the corresponding door lock position signals (at the level of the battery power supply voltage +B) that are produced from the corresponding door lock position switches SW1 to SW 5 are inputted into the microcomputer 10, through the corresponding door lock position signal input terminals LSW1 to LSW5 and the corresponding input resistances R11 to R15 (S502).

In the abnormal state where, for example, the door lock position switches SW1 to SW 5 are left turned on, a fault (indicated with X in FIG. 8) such as a short circuit occurs in the feedback system. As a result, the door lock position signal cannot be inputted into the microcomputer 10 normally. Thus, the ECU 1 assumes the present door lock position based on door unlock output control information, which is the internal control information stored in any one of ECUs. Following this, the assumed input value (the control value), which indicates the assumed door lock position, is alternatively inputted into the microcomputer 10 of the ECU 1.

To this end, the microcomputer 10 determines whether or not the door lock position signal input terminals LSW1 to LSW5 (in the case considered in FIG. 8, the door lock position signal input terminal LSW2) are at the level of the battery power supply voltage +B, which indicates that the doors are unlocked (S503 in FIG. 10). If normal (i.e., the door lock position signal input terminal LSW2 is at the level of the battery power supply voltage +B), a lock position switch signal (at the level of the battery power supply voltage +B) is inputted into the microcomputer 10 as the input value (S504). If abnormal, the microcomputer 10 assumes that the door lock position should be changed into 'unlock' after the door unlock control signal is outputted, based on the door unlock output control information, which is the internal control information stored in any one of ECUs. Subsequently, the assumed input value that shows the assumed door unlock position is alternatively inputted into the microcomputer 10 (S505).

According to the present embodiment, the assumed input value that shows the door lock position of the door is alternatively inputted into the microcomputer 10, based on the internal control information stored in any one of ECUs. Consequently, the alternative input value that more accurately represents the actual state of the vehicle can be obtained, thereby providing users with control over the door lock, which will live up to their expectations.

Additionally, in the third embodiment described above, although the vehicular door lock mechanism has been considered as a controlled object for example, the controlled object is not limited to the vehicular door lock mechanism.

Additional advantages and modifications will readily occur to those skilled in the art. The invention in its broader terms is therefore not limited to the specific details, representative apparatus, and illustrative examples shown and described.

For instance, in the first and second embodiments, the ON determination threshold voltage (first ON determination threshold voltage) may be used as an OFF determination threshold voltage (second OFF determination threshold voltage), and the OFF determination threshold voltage (first OFF determination threshold voltage) may be used as an ON determination threshold voltage (second ON determination threshold voltage). That is, as illustrated in FIGS. 2A, 5A, 6A, and 7A, the input value may be set at the OFF value and the ON value to indicate that the controlled object is OFF and ON when the input voltage is higher than the second OFF determination threshold.

What is claimed is:

1. An alternative input control method comprising:
   outputting to a controlled object a control signal that on-off controls the controlled object from an electronic control unit;
   determining whether the controlled object is turned on or not, based on an input voltage that is fed back into the electronic control unit from the controlled object; and
   repeatedly determining whether or not a battery supply voltage is equal to or higher than a defined voltage, wherein:
   the alternative input control method includes one of the following operations, if the battery supply voltage is equal to or higher than the defined voltage, as normal input processing:
      setting an input value at one of (1) an ON value that indicates the controlled object is turned on, when the input voltage is equal to or higher than a first ON determination threshold voltage, and (1) the OFF value that indicates the controlled object is turned off, when the input voltage is equal to or lower than a first OFF determination threshold voltage lower than the first ON determination threshold voltage; and
      setting the input value at one of (2) an OFF value that indicates the controlled object is turned off, when the input voltage is equal to or higher than a second OFF determination threshold voltage, and (2) the ON value that indicates the controlled object is turned on, when the input voltage is equal to or lower than a second ON determination threshold voltage lower than the second OFF determination threshold voltage; and
   the alternative input control method includes the following operation if the battery supply voltage is lower than the defined voltage, as alternative input processing:
      changing the input value in accordance with change of an output of the control signal, which is outputted from the electronic control unit.

2. The alternative input control method according to claim 1, wherein the controlled object includes at least one of:
   an accessory relay that controls power feeding to accessory; and
   an ignition relay that controls the power feeding to ignition.

3. The alternative input control method according to claim 1, wherein the control signal information is a previously stored input value.

4. The alternative input control method according to claim 1, wherein the control signal information is an assumed input value that is obtained from internal control information, which is stored in the electronic control unit.

5. The alternative input control method according to claim 1, further comprising filtering the input value.

6. An alternative input control device comprising:
   an electronic control unit that outputs to a controlled object a control signal that on-off controls the controlled object, and that determines whether the controlled object is turned on or off based on an input voltage, which is fed back from the controlled object, wherein the electronic control unit includes:

a battery supply voltage determination element that repeatedly determines whether or not a battery supply voltage is equal to or higher than a defined voltage;

a normal input value setting element, which performs one of following operations if the battery supply voltage is equal to or higher than the defined voltage:

setting an input value at one of (1) an ON value that indicates the controlled object is turned on, when the input voltage is equal to or higher than a first ON determination threshold voltage, and (1) the OFF value that indicates the controlled object is turned off, when input voltage is equal to or lower than a first OFF determination threshold voltage lower than the first ON determination threshold voltage; and setting the input value at one of (2) an OFF value that indicates the controlled object is turned off, when the input voltage is equal to or higher than a second OFF determination threshold voltage, and (2) the ON value that indicates the controlled object is turned on, when the input voltage is equal to or lower than a second ON determination threshold voltage lower than the second OFF determination threshold voltage; and an alternative input value setting element, which performs the following operations if the battery supply voltage is lower than the defined voltage:

changing the input value in accordance with change of an output of the control signal, which is outputted from the electronic control unit.

7. The alternative input control device according to claim 6, wherein the controlled object includes at least one of:

an accessory relay that controls power feeding to accessory; and an ignition relay that controls the power feeding to ignition.

8. The alternative input control device according to claim 6, wherein the control signal information is a previously stored input value.

9. The alternative input control device according to claim 6, wherein the control signal information is an assumed input value that is obtained from internal control information, which is stored in the electronic control unit.

10. The alternative input control device according to claim 6, further comprising a filter through which the input value is filtered.

* * * * *